United States Patent Office 2,715,842
Patented Aug. 23, 1955

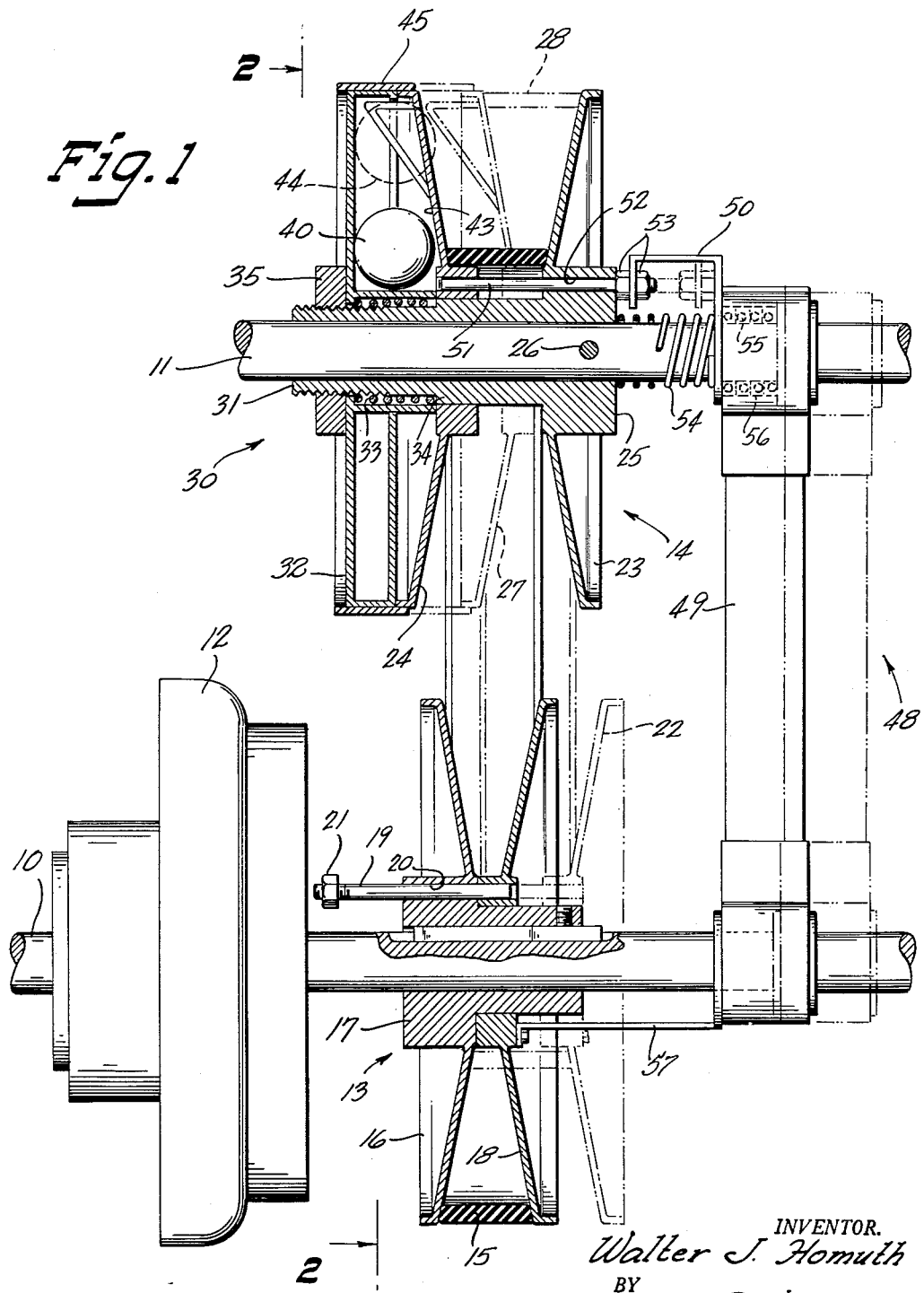

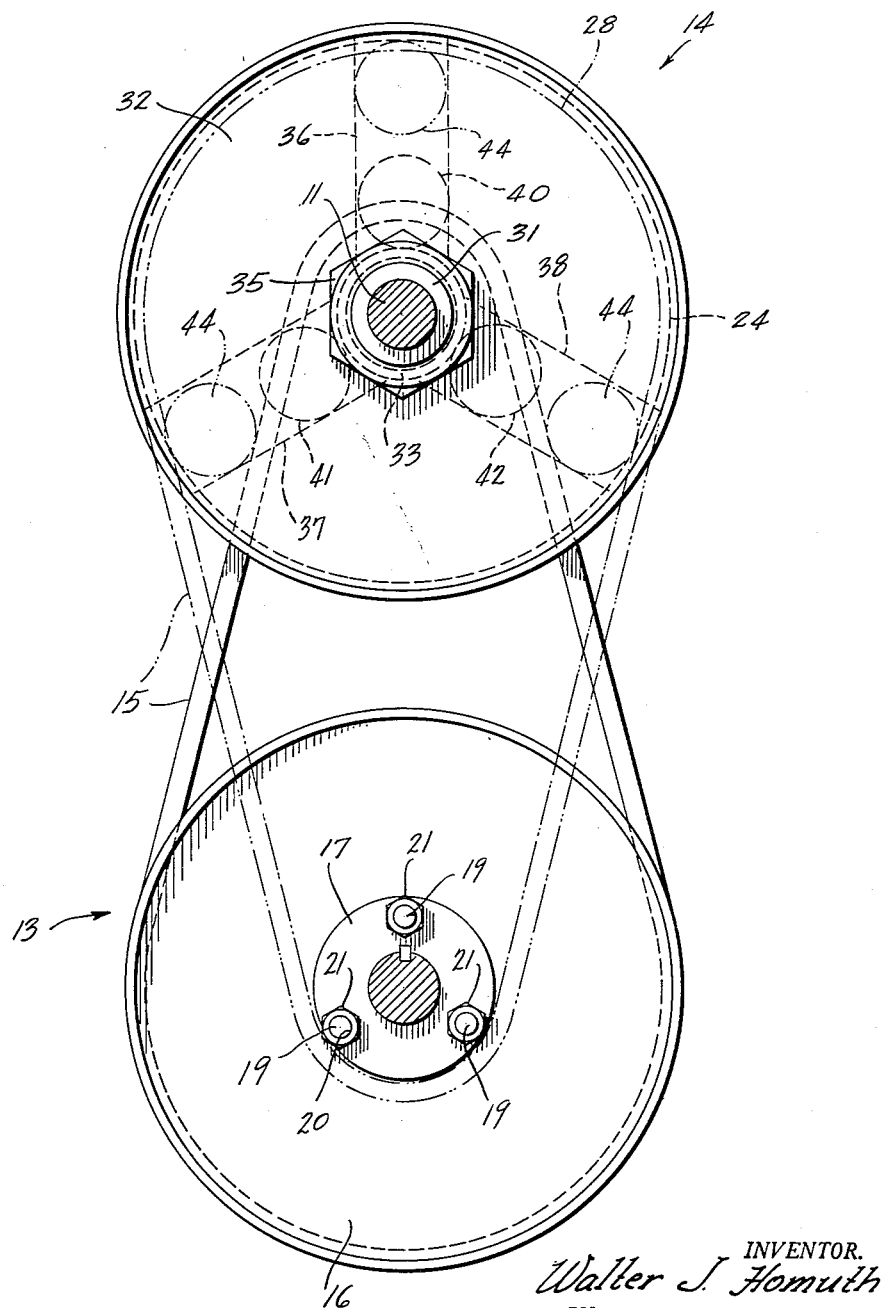

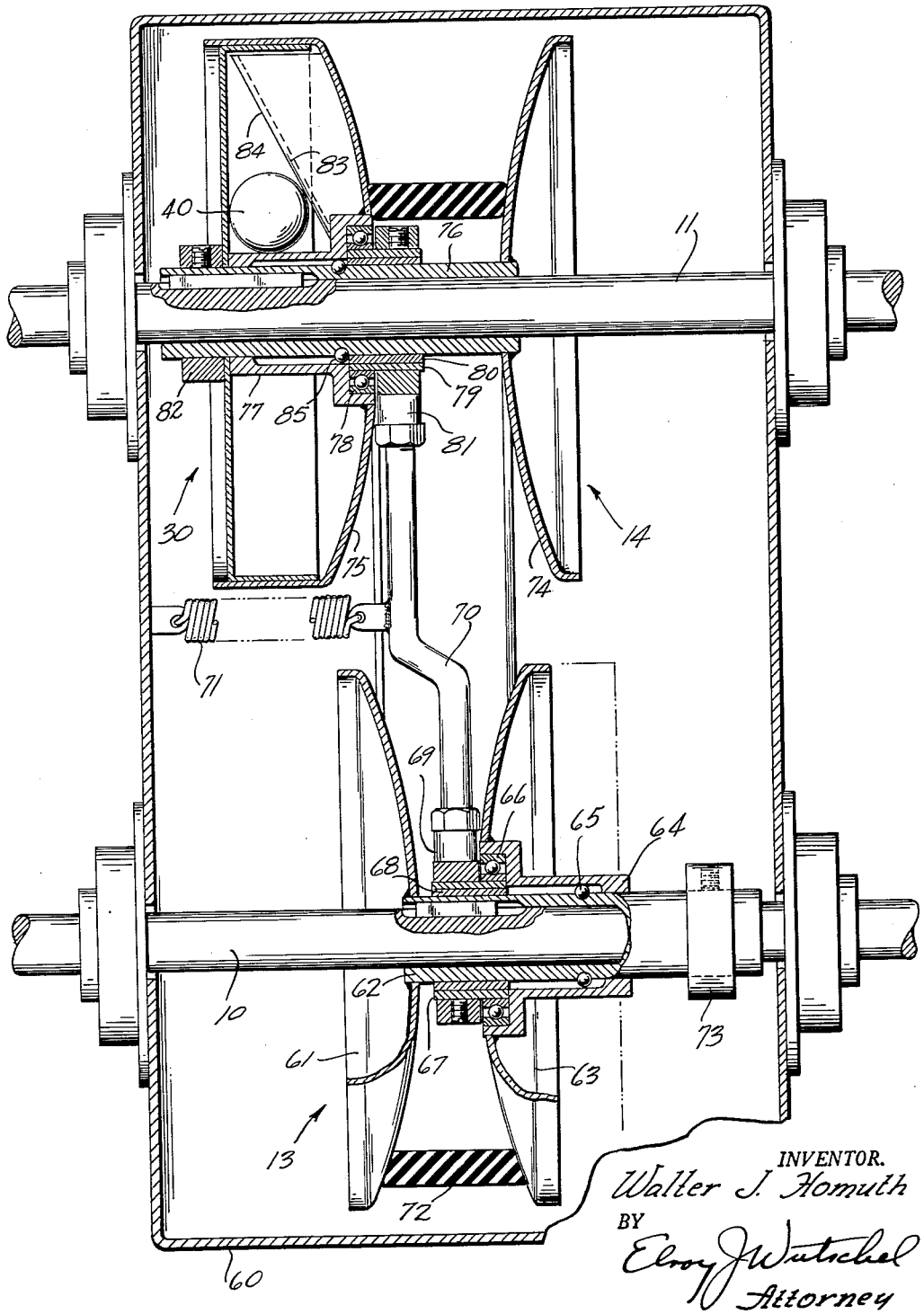

2,715,842

GOVERNOR CONTROLLED TRANSMISSION

Walter J. Homuth, Waukesha, Wis.

Application November 8, 1949, Serial No. 126,146

4 Claims. (Cl. 74—230.17)

This invention relates generally to transmissions and more particularly to a control mechanism therefor which is fully automatic.

A general object of the invention is to provide an automatic control for a variable speed transmission.

Another object of the invention is to provide a variable speed transmission in which the speed of the output shaft remains constant regardless of variations in speed of the input shaft.

Another object of the invention is to provide a transmission control mechanism designed to proportionately vary the pitch diameters of the sheaves from a single governor associated with the driven sheave.

Still another object of the invention is to provide a variable speed transmission control mechanism operative to maintain the operation of the driven member at a substantially constant speed.

Another object of the invention is to provide an automatic governor-control transmission mechanism.

Yet another object of the invention is to provide a transmission sheave arrangement in which the sheaves are unitarily shifted under even pressure to automatically provide a constant output.

A further object of the invention is to provide a variable speed drive mechanism automatically controlled to provide a constant output speed which may be readily adapted to drive generators, refrigerator units and the like.

According to this invention, an improved transmission having a governor actuated control means is provided to obtain a constant output speed regardless of the variations in the power input speed. The transmission is particularly adaptable for driving generators, refrigerators and other mechanisms wherein it is particularly advantageous to have the driven member operate at a constant speed. The transmission includes a pair of sheaves or pulleys interconnected by means of a flexible belt in a well known manner. Each half of the sheave is disposed for axial adjustment whereby it is possible to vary the position of the belt thereon. The axial displacement of the pulley cones is effected by means of an automatic governor operatively associated with one of the pulley cones. A cam surface integrally formed on the side of the movable driven cone serves to determine the rate of sidewise adjustment imparted to the cone by the governor. A control arm interconnecting the movable cone portion of each of the sheaves provides for a unitary and opposite variance in the pitch diameters. Since the governor mechanism is operatively disposed in the driven sheave and serves to actuate the two sheaves simultaneously, a constant output speed is assured.

The foregoing and other objects of the invention which will become more fully apparent from the following detailed description exemplifying the preferred embodiments thereof, may be achieved by the apparatus described herein in connection with the accompanying drawing, in which:

Figure 1 is a detailed view taken on a vertical plane through a pair of sheaves showing the automatic governor controlled variable speed mechanism;

Fig. 2 is a sectional side elevation of the transmission taken approximately on the plane of lines 2—2 in Fig. 1; and Fig. 3 is a vertical view of a modified version of the invention.

In many mechanical applications it is particularly advantageous to drive a mechanism at a constant speed rate while the only source of power for this purpose is one which varies beyond permissible limits. An example of such an application entails the requirement of driving a generator at a constant speed rate from a variable power source such as an internal combustion engine. At the lower output speeds of the engine, the generator set would not be driven at a high enough speed to provide the required current output while at the higher rates of engine speed, the generator would be driven at an increasingly higher rate which might result in damage to the generator. To this end, the transmission herein disclosed is particularly adaptable.

In the particular embodiment of the invention shown by way of illustration in the accompanying drawings, the transmission utilized for this purpose consists of an input shaft 10 and an output shaft 11 parallely disposed, as shown in Fig. 1. The input shaft 10 is power driven via a clutch 12 connected directly thereto. A pair of sheaves 13 and 14 operatively mounted on the input and output shafts 10 and 11, respectively, are interconnected by means of a flexible V belt 15 operatively disposed thereon. Thus the output shaft 11 may be power driven via the clutch 12.

As shown in Fig. 1, a cone disc 16 constituting the leftwardly half of the sheave 13 is keyed to the power input shaft 10 in a well known manner. The disc 16 is integrally formed with a hub portion 17 on which a cone disc 18 of opposite taper to that of disc 16 is slidably mounted for selective axial adjustment. The two discs 16 and 18 are disposed for unitary rotative movement by means of a plurality of studs or pins 19. The studs 19 are fixedly mounted in the cone disc 18 and extend through similarly disposed bores 20 in the hub portion 17 of the cone disc 16. While the abutment of the disc 18 with the disc 16 serves to determine the minimum spacing of the disc elements, the maximum spacing of the disc elements in the sheave 13 is limited by an adjustable nut 21 threadably retained on the end of the studs or pins 19. The maximum spacing of the cone discs being indicated by dotted lines 22.

The driven sheave 14 on the output shaft 11 is comprised of a stationary cone disc 23 and movable cone disc 24 of oppositely disposed tapers identical to that of the discs 16 and 18. The disc 23 is integrally formed with a hub portion 25. The hub portion is operably retained for unitary rotation with the output shaft 11 by means of a tapered pin 26. The disc 24 is precisely fitted for co-axial sliding movement on the hub portion 25 of disc 23, as shown in Fig. 1. The range of movement of the disc 24 is indicated by the distance between the full line drawing thereof and dotted lines 27. The minimum spacing of the two discs 23 and 24 is effected when the two elements are disposed in abutting relationship whereat further rightwardly movement of the disc 24 is not possible. At this time the V belt 15 disposed in the sheave 14 is riding the outer peripheral limits of the cone discs 23 and 24, as indicated by dotted lines 28.

The variable axial positioning of the movable cone disc 24 in the sheave 14 is automatically controlled by means of a governor 30 mounted on a leftwardly extending hub sleeve 31 integrally formed with the hub 25. The automatic governor includes a hollow disc member 32. The disc member is supported for axial movement on the sleeve 31. A spring 33 is mounted to abut an annular ridge 34 on the sleeve 31 and the disc member 32 in a manner to force the disc axially leftwardly, with a nut 35 threadedly retained on the extreme left end of the sleeve 31 serving to limit the movement of the disc member 32 thereon. As shown in Fig. 2, the disc member 32 is provided with three radial recesses 36, 37 and 38. These recesses serve as guide tracks for three steel balls 40, 41 and 42 respectively. When the disc member 32 is rotating with the output shaft 11 in the slow speed range, the three balls ride at the bottom of their respective radial tracks. At this time, the back cam surface of the cone disc 24 engages the three balls and the disc will then be positioned at the maximum outermost position whereat the V belt 15 will be riding in the extreme bottom of the sheave. If the speed of the sheave is increased slightly, centrifugal force imparted to the balls 40, 41 and 42 will cause them to slide radially outwardly and thereby effect a rightwardly axial movement of the cone disc 24. When this occurs, the spacing between the discs 23 and 24 is reduced and the V belt 15 is forced to ride higher in the sheave groove. As shown in Fig. 1, the back side of the disc 24 serves as a cam surface 43 for the three balls. While this cam surface may be of any predetermined configuration, it must serve to control the rate of axial disc movement as the rotative speed of the sheave 14 is varied. When the three balls have moved from the innermost radial position shown in Figs. 1 and 2, to the outermost radial position as indicated by dotted circular lines 44, the cone disc 24 will have been advanced to provide a minimum spacing between the discs in the sheave 14. At this time the V belt 15 will be riding in the vicinity of the periphery of the discs in the sheave 14. It should be noted that the cam surface 43 is designed to provide a faster rate of sidewise adjustment to the sheave 24 as the speed of the sheave increases. An annular band 45 securely fitted to the outer periphery of the cone disc 24 serves to fully enclose the operating mechanism within the governor 30. This keeps dirt and other foreign objects out of of the mechanism and insures the proper functioning thereof whenever the speed of the sheave 14 varies because of a change in the rate of rotation of the driving sheave 13.

In order that the spacing of the discs of the sheave 13 be effected simultaneously with the spacing of the discs in the sheave 14 as determined by the operation of the automatc governor 30, an interconnecting control mechanism 48 is provided. This mechanism is mechanically connected to each of the movable cone discs in the two sheaves. The mechanism includes a control arm 49 supported on the shafts 10 and 11 for sidewise movement, as shown in Fig. 1. The upper end of the arm is provided with a rotatably supported bracket 50, which, in turn, is connected to the movable cone disc 24 by means of a pin 51. The pin 51 is fixedly mounted in the disc 24 and extends through a bore 52 in the hub portion 25 of the cone disc 23. The outer end of the pin 51 is threaded to receive a pair of adjustable lock nuts 53 whereby the bracket 50 is secured to the pin 51. A spring 54 abutting against the side of the hub 25 engages the side of the rotatable bracket 50 in the control arm 49 and serves to continuously force it rightwardly whereby the movable cone disc 24 is normally urged in a manner to retain the spacing of the discs at a minimum. This serves to keep the discs in constant engagement with the tapered sides of the V belt 15. A plurality of ball bearings 55 are operatively retained in annular grooves 56 in the inner bore of bracket 50 in the control arm 49 and operate to provide easy sidewise adjustment of the control arm. The ball bearings 55 engage the surface of the output shaft 11 and carry the arm as it is moved sidewise to effect an adjustment of the sheaves.

The lower end of the arm 49 is likewise provided with a ball bearing mounting (not shown) for a bracket 57 securely attached to the side of the movable cone disc 18 and disposed to rotate therewith. The rightwardly limits of movement of the control arm 49 is indicated by the dotted line shown in Fig. 1. When the arm is in this position, the disc 24 in the sheave 14 will have been shifted rightwardly to a position whereat the V belt is riding at the outer periphery of the tapered surfaces of the discs 23 and 24, while the movable disc 18 will have been adjustably shifted to permit the V belt to ride at the bottom of the tapered groove provided by the discs 16 and 18 in the sheave 13. Likewise, with the control arm 49 in the leftwardly position indicated by the solid line showing in Fig. 1, the movable disc 24 in the sheave 14 will be disposed to permit the V belt to ride in the bottom of the tapered groove while the movable disc 18 in the sheave 13 is adjustably disposed to force the V belt to ride at the outer extremity of the tapered groove. Depending upon the operation of the automatic governor 30, the movable disc 24 may be shifted to any intermediate point between these limits while the control arm 49 and the associated linkage mechanisms will serve to effect a simultaneous adjustment of the movable disc 18 in the sheave 13. It may be well to note that this adjustment of the sheaves is always inverse and simultaneous. Thus the pitch diameters of the two sheaves may be readily varied by the automatic governor 30 operatively disposed on the driven shaft 11.

A modified version of the invention, as shown in Fig. 3, provides for the simultaneous adjustment of a pair of sheaves automatically, as aforedescribed. The driving sheave 13 is operably mounted on the input shaft 10 while the driven sheave 14 is operably mounted on the output shaft 11. The transmission mechanism is enclosed in a transmission case 60 with the shafts 10 and 11 parallelly journalled therein. In this instance, the sheave 13 is comprised of a pressed cone disc 61 integrally welded to a sleeve portion 62 fixedly carried on the shaft 10. A second cone disc 63 is integrally disposed with a sliding hub member 64 mounted for coaxial movement on the rightwardly extending end of the sleeve portion 62. A plurality of evenly spaced bearings 65 socketed in the peripheral face of the sleeve 62 serve to support the hub member 64 for axial movement thereon and to insure unitary rotation of the discs 61 and 63. The other end of the hub member 64 is supported on a roller bearing 66 mounted on a non-rotatable sleeve element 67. The sleeve 67, in turn, is mounted on a sleeve bearing 68 rotatably carried on the sleeve portion 62 intermedially of the two cone discs 61 and 63. A mounting hub 69 is fixedly retained on the sleeve 67 and is adjustably attached to an actuating arm 70 extending outwardly between the two discs of the sheave 13. A spring 71 serves to normally retain the arm 70 in an extreme leftwardly position whereat the two discs 61 and 63 will be retained at a minimum spacing. In this position a V belt 72 riding on the oppositely tapered surfaces of the disc will be forced outwardly and contained immediately adjacent the periphery of the sheave 13. When the arm 70 is moved rightwardly in opposition to the force of the spring 71 anchored to the case 60, the mounting hub 69 and sleeve element 67 supporting the bearing 66 and cone disc 63 will be forced rightwardly to any intermediate position with the outermost position being determined by the location of a collar 73 adjustably mounted on the rightwardly end of the sleeve portion 62. When the end of the hub 64 engages the side of the collar 73, the V belt 72 will ride in the lowermost position between the adjustable cone discs of the sheave 13.

The driven sheave 14 is likewise constituted of two cone discs 74 and 75. The disc 74 is integrally welded to a sleeve bearing portion 76 keyed for rotation with the output shaft 11. The cone disc 75 is welded to a hub 77 rotatably mounted on the leftwardly end of the bearing portion 76. The right end of the hub 77 is supported on a roller bearing 78 mounted on a sleeve element 79 which, in turn, is carried on a sleeve bearing 80 rotatably supported on the sleeve portion 76 between the two discs 74 and 75. A mounting hub 81 is fixedly carried on the sleeve element 79 between the two discs and is attached to the actuating arm 70. With this arrangement both of the cone discs 74 and 75 can be readily rotated although the mounted hub 81 and sleeve element 79 disposed therebetween is non-rotatably retained by the actuating arm 70. The arrangement of the mechanism is such that the automatic spacing of the discs in the sheave 13 is opposite to that of the discs in the sheave 14. Thus, with the actuating arm retained in the extreme leftwardly position shown in Fig. 3, the cone disc 75 is forced to its extreme leftwardly position to provide the maximum spacing between the discs whereat the V belt 72 will ride in the lowest portion between the discs. When the actuating arm 70 is shifted rightwardly from the position shown in Fig. 3, the spacing between the two discs will be narrowed and thus force the V belt outwardly toward the periphery of the discs.

The automatic operation of the two sheaves 13 and 14 is effected by means of a governor 30 operably mounted on the leftwardly end of the sleeve portion 76. The governor 30 is retained in position by means of a collar 82 fixedly retained on the portion 76. The operation of the governor 30 is identical to that described previously with a plurality of steel balls operably disposed to engage a grooved cam surface 83. The grooved surface is formed on the side of a saucer-shaped cam plate 84 attached to the side of the cone disc 75 as shown in Fig. 3. A series of socketed balls 85 mounted on the sleeve portions 76 serves to limit the rightwardly movement of the hub 77 when the governor is functioning to shift the cone disc 75 rightwardly. It will be apparent from the description of this modified version that the number of parts have been considerably reduced in the structure while the functioning thereof is identical to the means previously described.

It may be well to note that with this arrangement a belt 72 will move sidewise in accordance with the movement of the adjustable discs 63 and 75 in the sheaves. No lateral adjustment of the sheaves 13 and 14 is necessary since they are initially offset on the driving and driven shafts 10 and 11, respectively. An offset is provided in the actuating arm 70 to compensate for the offset of the sheaves.

The transmission and control mechanism disclosed in this invention is extremely compact and fully automatic in its operation. The automatic governor and its associated linkage control mechanism effects a simultaneous adjustment of the two sheaves 13 and 14 and eliminates the possibility of any variance in the pitch diameters of the sheaves. This feature is extremely beneficial in that it reduces the generation of heat to a minimum and likewise reduces belt wear. A constant side pressure is maintained on the V belt 15 at all times during the operation of the transmission with a resultant constant tension imparted thereto minimize slippage. With this arrangement, it is possible to maintain a constant speed in the operation of the output or driven shaft 11 regardless of the variations in the speed of the input or driving shaft 10. Since the operation of the automatic governor 30 is dependent upon the slightest variations in the rate of rotation of the driven sheave 14, the precise control of the speed of the driven shaft is readily possible and a constant speed of the output shaft 11 is assured.

While the development of the aforedescribed transmission and control mechanism was effected for the purpose of precisely maintaining a constant speed of the input shaft to a generator, it is to be understood that this mechanism has numerous other appliactions, for example, in the power drive of refrigerators, constant output pumps, laboratory testing devices, and the like, where it is of extreme importance that the speed of the output shaft be maintained constant at all times.

Although the illustrative embodiment of the invention herein set forth has been described in considerable detail in order to make a full disclosure thereof, it is to be understood that the apparatus described is intended to be illustrative only and that various novel features may be incorporated in other structural forms without departing from the spirit and scope of the invention as defined in the subjoined claims.

The principles of the invention have now been fully explained in connection with the foregoing description of the illustrative embodying apparatus, the invention is hereby claimed as follows:

1. In a governor controlled transmission, a pair of oppositely tapered pulley discs comprising a driving pulley, a hub portion carried by one of said pulley discs with the other of said discs being slidably mounted for sidewise adjustment thereon, a second pair of oppositely tapered discs comprising a driven pulley, a hub portion carried by one of said pulley discs with the other of said discs slidably mounted upon said hub for sidewise adjustment, a belt interconnecting said pulleys, a governor mounted on said hub portion of said driven pulley and operative on a cam integrally formed on the side of said disc disposed for sidewise adjustment on said driven hub portion, and an actuating mechanism connected for simultaneous sidewise movement with said adjustable disc in said driven pulley and attached to said adjustable disc in said driving pulley whereby said adjustable disc in each of said pulleys is unitarily positioned to vary the pitch diameters of said pulleys according to the demands of said governor and thus maintain a substantially constant speed of said driven pulley regardless of variations in speed of said driving pulley.

2. A constant speed drive mechanism operative to derive a constant power output from a variable power input and comprising a variable speed transmission, an adjustable sheave operably mounted on a power output shaft, an adjustable sheave operably mounted on a power input shaft, a V belt interconnecting said sheaves, an automatic governor operably disposed for unitary rotation with said power output sheave, a plurality of radial guide tracks in said governor, a camming ball mounted in each of said tracks and disposed to engage a cam surface on the side of said adjustable sheave, a resilient means operative on said power output sheave to maintain constant engagement between said balls and said sheave, and a linkage mechanism connecting said governor operated output sheave with said adjustable sheave on said power input shaft whereby both of said sheaves are simultaneously adjusted upon the control of said governor rendered operative by variations in speed of said adjustable power output sheave.

3. In a variable speed transmission mechanism, a pair of pulley discs comprising a sheave, a hub portion fixed to one of said discs and disposed to slidably support the other of said discs for sidewise adjustment thereon, a second pair of pulley discs comprising a second sheave, a hub portion fixed to one of said second named discs and disposed to slidably support the other of said discs for sidewise adjustment thereon, a belt operatively interconnecting said sheaves, a speed responsive governor mounted on the hub portion of said second named sheave and operative on a cam integrally formed on the side of said disc disposed for sidewise adjustment, and a uniform actuating mechanism connected to said adjustable discs in said first named and second named sheaves whereby said adjustable discs in each of said sheaves are simultaneously adjusted according to the dictates of said governor to maintain a substantially constant speed of said second named sheave of the variable speed transmission.

4. In a variable speed transmission mechanism, a pair of pulley discs comprising a sheave, a hub portion fixed to one of said discs and disposed to slidably support the other of said discs for sidewise adjustment thereon, a second pair of pulley discs comprising a second sheave, a hub portion fixed to one of said second named discs and disposed to slidably support the other of said discs for sidewise adjustment thereon, a belt operatively interconnecting said sheaves, a speed controlling governor mounted on said hub portion of said second named sheave and operative on a cam integrally formed on the side of said disc disposed for sidewise adjustment, an actuating mechanism intermediately disposed between the discs of said first named sheave and said second named sheave and connected to the adjustable disc of each of said sheaves, and a resilient means operatively connected to said actuating mechanism whereby speed variations effectively operate said governor to continuously vary the adjustment of said actuating mechanism and sheave discs to effect a substantially constant speed output from said second named sheave in the transmission.

References Cited in the file of this patent

UNITED STATES PATENTS

| | | |
|---|---|---|
| 784,484 | Fredeen | Mar. 7, 1905 |
| 1,209,717 | King | Dec. 26, 1916 |
| 1,837,923 | Quinn | Dec. 22, 1931 |
| 2,158,367 | Henney | May 16, 1939 |
| 2,310,081 | Hill | Feb. 2, 1943 |
| 2,479,764 | Morton | Aug. 23, 1949 |
| 2,533,197 | Pinkvoss | Dec. 5, 1950 |

FOREIGN PATENTS

| | | |
|---|---|---|
| 11,449 | Great Britain | A. D. 1905 |
| 202,332 | Great Britain | Aug. 13, 1923 |
| 592,141 | Great Britain | Sept. 9, 1947 |
| 52,375 | France | Nov. 29, 1943 |
| | (1st addition to No. 883,174) | |
| 356,924 | Italy | Feb. 22, 1938 |
| 432,754 | Italy | Mar. 26, 1948 |